(12) United States Patent
Reepmeyer et al.

(10) Patent No.: US 12,270,337 B1
(45) Date of Patent: Apr. 8, 2025

(54) GAS TURBINE ENGINE OIL FLOW CONTROL SYSTEM

(71) Applicant: General Electric Company, Schenectady, NY (US)

(72) Inventors: James Ryan Reepmeyer, Montgomery, OH (US); Arthur William Sibbach, Boxford, MA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 18/501,173

(22) Filed: Nov. 3, 2023

(51) Int. Cl.
- *F01D 25/20* (2006.01)
- *F02C 7/06* (2006.01)
- *F16N 29/00* (2006.01)

(52) U.S. Cl.
CPC ............... *F02C 7/06* (2013.01); *F16N 29/00* (2013.01); *F16N 2210/02* (2013.01); *F16N 2280/04* (2013.01)

(58) Field of Classification Search
CPC .............................. F16N 2210/02; F01M 1/16
See application file for complete search history.

(56) References Cited

U.S. PATENT DOCUMENTS

| | | | | |
|---|---|---|---|---|
| 6,626,141 B2 * | 9/2003 | Choi | ........................ | F01M 1/20 123/196 R |
| 7,506,724 B2 * | 3/2009 | Delaloye | ................. | F01D 25/18 184/6.4 |
| 8,734,122 B2 * | 5/2014 | Murray | .................... | F01M 1/20 123/196 CP |
| 9,353,849 B2 * | 5/2016 | Uusitalo | ............. | F16H 57/0435 |
| 9,683,652 B2 * | 6/2017 | Poster | ..................... | B64C 27/12 |
| 10,526,973 B2 * | 1/2020 | Waissi | ..................... | F02C 7/236 |
| 10,900,422 B2 * | 1/2021 | Logan | ..................... | F28F 27/02 |
| 11,371,436 B2 * | 6/2022 | Legare | .................. | F01D 21/003 |
| 11,512,615 B2 * | 11/2022 | Dupays | .................. | F01M 11/12 |
| 2001/0047647 A1 * | 12/2001 | Cornet | .................... | F01D 15/08 60/39.08 |
| 2007/0169997 A1 * | 7/2007 | Delaloye | ................. | F04B 49/20 184/6.11 |
| 2018/0372006 A1 * | 12/2018 | Chalaud | .................... | F02C 9/38 |
| 2021/0222621 A1 * | 7/2021 | Legare | .................... | F01D 25/20 |
| 2022/0154599 A1 * | 5/2022 | Haga | .................... | B64D 27/026 |
| 2023/0349511 A1 * | 11/2023 | Rupprecht | ............... | F16N 7/38 |

FOREIGN PATENT DOCUMENTS

DE 102017122115 A1 3/2019

* cited by examiner

*Primary Examiner* — Michael A Riegelman
(74) *Attorney, Agent, or Firm* — Smith Gambrell & Russell LLP

(57) ABSTRACT

A gas turbine engine oil flow control system can include a variable flow oil pump useful to provide oil at varying rates to a variety of oil consumers, such as, power gearboxes, engine shaft bearings, electrical generators, etc. Oil flow control valves that have an ability to provide a variable flow of oil can be used in conjunction with the variable flow oil pump. Flow sensors can be used along with an oil flow controller to measure a flow of oil at various points in the gas turbine engine oil flow control system. The oil flow controller can use information from the flow sensors along with a variable consumption demand association with one or more of the oil consumers (either provided to the oil controller or calculated based upon an operational need of the oil consumer) to change operation of the variable flow oil pump and/or oil flow control valve.

8 Claims, 7 Drawing Sheets

GAS TURBINE ENGINE OIL FLOW CONTROL SYSTEM

FIELD

The present disclosure relates to oil flow control systems used in gas turbine engines.

BACKGROUND

A gas turbine engine generally includes a fan and a core arranged in flow communication with one another. The core of the gas turbine engine generally includes, in serial flow order, a compressor section, a combustion section, a turbine section, and an exhaust section. In operation, at least a portion of air over the fan is provided to an inlet of the core. Such a portion of the air is progressively compressed by the compressor section until it reaches the combustion section. Fuel is mixed with the compressed air and burned within the combustion section to provide combustion gases. The combustion gases are routed from the combustion section through the turbine section to drive one or more turbines within the turbine section. The one or more turbines within the turbine section may be coupled to one or more compressors of the compressor section via respective shaft(s). The combustion gases are then routed through the exhaust section, e.g., to the atmosphere.

Gas turbine engines accordingly include a variety of rotating components, which are typically provided with some form of oil for use with one or more oil consumers that require use of the oil. For example, the gas turbine engines include one or more bearings for supporting rotation of the shaft(s) connecting the turbine section to the compressor section. An electric generator may be used in association with the gas turbine engine and that may use oil as a coolant. Providing oil at reliable flow rates to various oil consumers remains an area of interest. Improvements to the provisioning of oil to a variety of oil consumers in association with gas turbine engine operation would be useful in the art.

BRIEF DESCRIPTION OF THE DRAWINGS

A full and enabling disclosure of the presently described technology, including the best mode thereof, directed to one of ordinary skill in the art, is set forth in the specification, which makes reference to the appended figures, in which.

DETAILED DESCRIPTION

Figure 1:
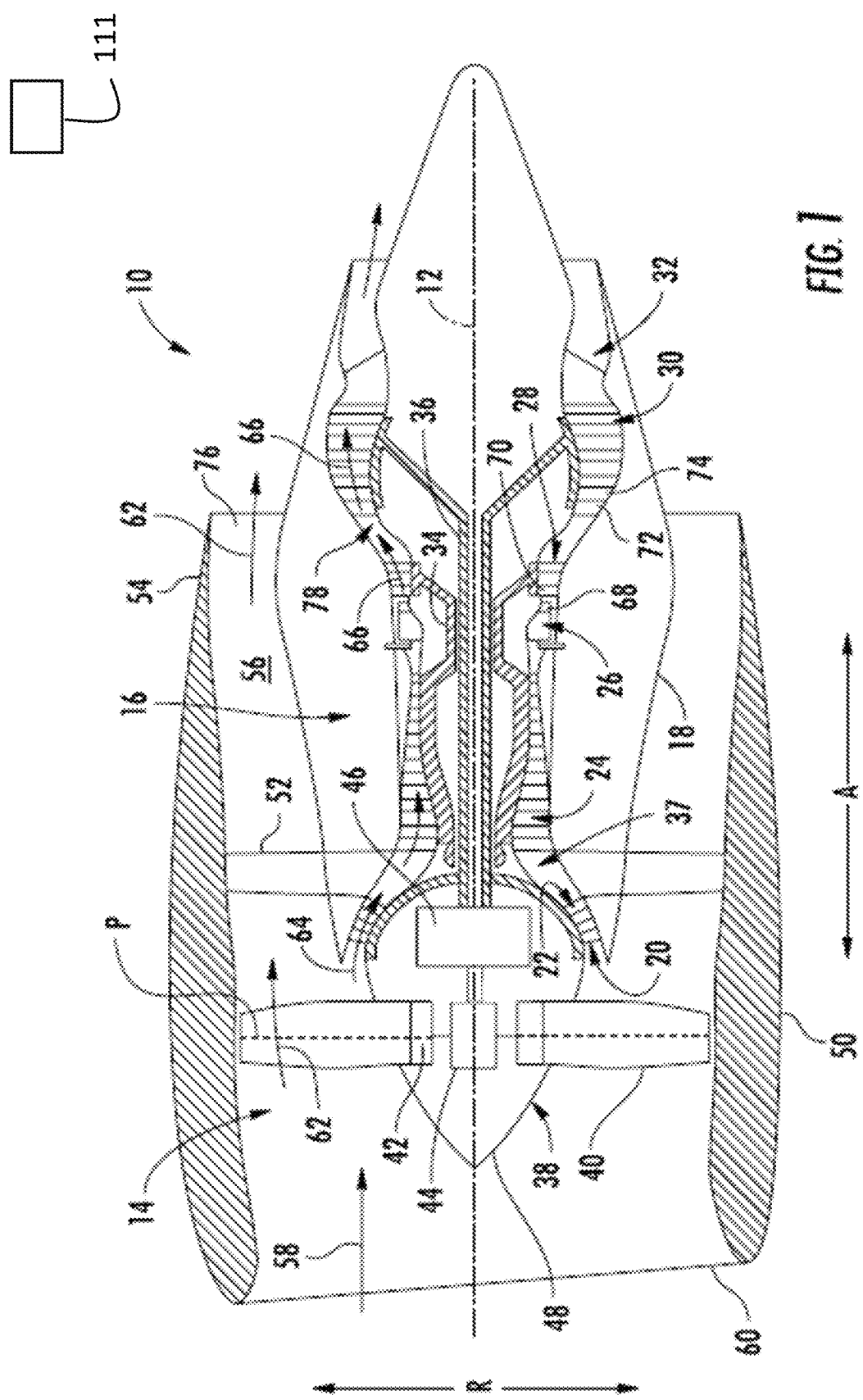
FIG. 1 is a schematic, cross-sectional view of a gas turbine engine in accordance with an exemplary aspect of the present disclosure.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The singular forms "a", "an", and "the" include plural references unless the context clearly dictates otherwise.

The term "turbomachine" refers to a machine including one or more compressors, a heat generating section (e.g., a combustion section), and one or more turbines that together generate a torque output.

The term "gas turbine engine" refers to an engine having a turbomachine as all or a portion of its power source. Example gas turbine engines include gas turbine engines, turboprop engines, turbojet engines, turboshaft engines, etc., as well as hybrid-electric versions of one or more of these engines.

The term "combustion section" refers to any heat addition system for a turbomachine. For example, the term combustion section may refer to a section including one or more of a deflagrative combustion assembly, a rotating detonation combustion assembly, a pulse detonation combustion assembly, or other appropriate heat addition assembly. In certain example embodiments, the combustion section may include an annular combustor, a can combustor, a cannular combustor, a trapped vortex combustor (TVC), or other appropriate combustion system, or combinations thereof.

The terms "axial" and "axially" refer to directions and orientations that extend substantially parallel to a reference axis. Moreover, the terms "radial" and "radially" refer to directions and orientations that extend substantially perpendicular to the reference axis. In addition, as used herein, the terms "circumferential" and "circumferentially" refer to directions and orientations that extend arcuately about the reference axis.

The terms "coupled," "fixed," "attached to," and the like refer to both direct coupling, fixing, or attaching, as well as indirect coupling, fixing, or attaching through one or more intermediate components or features, unless otherwise specified herein.

As used herein, the terms "first", "second", and "third" may be used interchangeably to distinguish one component from another and are not intended to signify location or importance of the individual components.

The present disclosure is generally related to systems and methods for controlling oil flow used with oil consumers associated with operation of a gas turbine engine. During operation of a gas turbine engine, one or more oil consumers, such as a power gearbox or electric machine, may require a change in lubrication (such as in the power gearbox) or a change in cooling (such as in the electric machine where oil can be used as a heat exchange medium). A variable flow oil pump can be used, powered by the gas turbine engine or any other suitable power source, to provide a variable flow of oil for use with the one or more oil consumers. The variable flow oil pump can be electrically driven (e.g., via an external power source such as a battery, or by an electrical generator driven by the gas turbine engine) or mechanically driven (e.g., via a shaft driven by the gas turbine engine). Furthermore, an oil flow control valve can also be used to ensure an appropriate amount of oil is delivered to an associated oil consumer. An oil flow controller can be used to operate the variable flow oil pump and oil flow control valve in harmony. The oil flow controller can change the variable flow oil pump and/or the oil flow control valve based upon a variable consumption demand related to an oil consumer associated with the oil flow control valve. The oil flow controller can also use additional information, such as flow rate data generated from a flow rate sensor, and/or flow data from a flow data sensor (e.g., a sensor(s) that measures pressure and/or temperature) to aid in controlling the variable flow oil pump and/or the oil flow control valve. Such flow rate data will be understood to include a single data point or plural data points indicative of a rate of oil as will be described further hereinbelow.

Referring now to the drawings, wherein identical numerals indicate the same elements throughout the figures, FIG. 1 is a schematic cross-sectional view of a gas turbine engine 10 in accordance with an exemplary embodiment of the present disclosure. More particularly, for the embodiment of FIG. 1, the gas turbine engine 10 is in the form of a high-bypass turbofan jet engine, referred to herein as "turbofan engine." The gas turbine engine 10, in other embodiments, can take on other forms, such as, but not limited to, a turbojet engine, a turboprop engine, and a turboshaft engine. No limitation is intended by reference to a turbofan engine. As shown in FIG. 1, the gas turbine engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. Additionally, the exemplary core turbine engine 16 includes, and the outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22. The compressor section, combustion section 26, turbine section, and nozzle section 32 together define a core air flowpath 37.

For the embodiment depicted, the fan section 14 includes a variable pitch fan 38 having a plurality of fan blades 40 coupled to a disk 42 in a spaced apart manner. Not all embodiments need include a variable pitch fan 38. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable pitch change mechanism 44 configured to collectively vary the pitch of the fan blades 40 in unison. The fan blades 40, disk 42, and pitch change mechanism 44 are together rotatable about the longitudinal axis 12 by LP shaft 36 across a power gear box 46. The power gear box 46 includes a plurality of gears for adjusting the rotational speed of the fan 38 relative to the LP shaft 36 to a more efficient rotational fan speed.

Referring still to the exemplary embodiment of FIG. 1, the disk 42 is covered by a rotatable front hub 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. The exemplary nacelle 50 is supported relative to the core turbine engine 16 by a plurality of circumferentially-spaced outlet guide vanes 52. Moreover, a downstream section 54 of the nacelle 50 extends over an outer portion of the core turbine engine 16 so as to define a bypass airflow passage 56 therebetween.

During operation of the gas turbine engine 10, a volume of air 58 enters the turbofan 10 through an associated inlet 60 of the nacelle 50 and/or fan section 14. As the volume of air 58 passes across the fan blades 40, a first portion of the air 58 as indicated by arrows 62 is directed or routed into the bypass airflow passage 56 and a second portion of the air 58 as indicated by arrow 64 is directed or routed into the core air flowpath 37, or more specifically into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

The exemplary gas turbine engine 10 depicted in FIG. 1 is configured as an under-wing mounted, commercial aircraft engine. Commercial aircraft engines are integrated into aircraft operated for hire to transport passengers and/or cargo. Commercial aircraft engines are required by, e.g., government regulations and economic drivers, to emphasize reliability, fuel efficiency, low emissions, etc., over, e.g., power production and responsiveness, which are valued in military aircraft engines. Additionally, the exemplary gas turbine engine 10 depicted in FIG. 1 is configured to generate a relatively large amount of thrust. For example, the exemplary gas turbine engine 10 depicted in FIG. 1 may be configured to generate at least about 14,000 pounds of thrust at takeoff under standard day conditions (e.g., sea level and approximately 60° F.). However, in other exemplary embodiments, the gas turbine engine 10 may instead be configured to generate at least about 18,000 pounds of thrust, at least about 20,000 pounds of thrust, at least about 30,000 pounds of thrust, at least about 40,000 pounds of thrust, or more. Notably, as the gas turbine engine 10 depicted is configured as a commercial aircraft engine, the gas turbine engine 10 may be required to generate such thrust more reliably than, e.g., a similarly-sized military aircraft engine.

It should be appreciated, however, that the exemplary gas turbine engine 10 depicted in FIG. 1 is by way of example only, and that in other exemplary embodiments, the gas turbine engine 10 may have any other suitable configuration. It should also be appreciated that, in still other exemplary embodiments, aspects of the present disclosure may be incorporated into any other suitable gas turbine engine. For example, in other exemplary embodiments, aspects of the present disclosure may be incorporated into, e.g., a turboprop engine, a turboshaft engine, or a turbojet engine.

Figure 2:
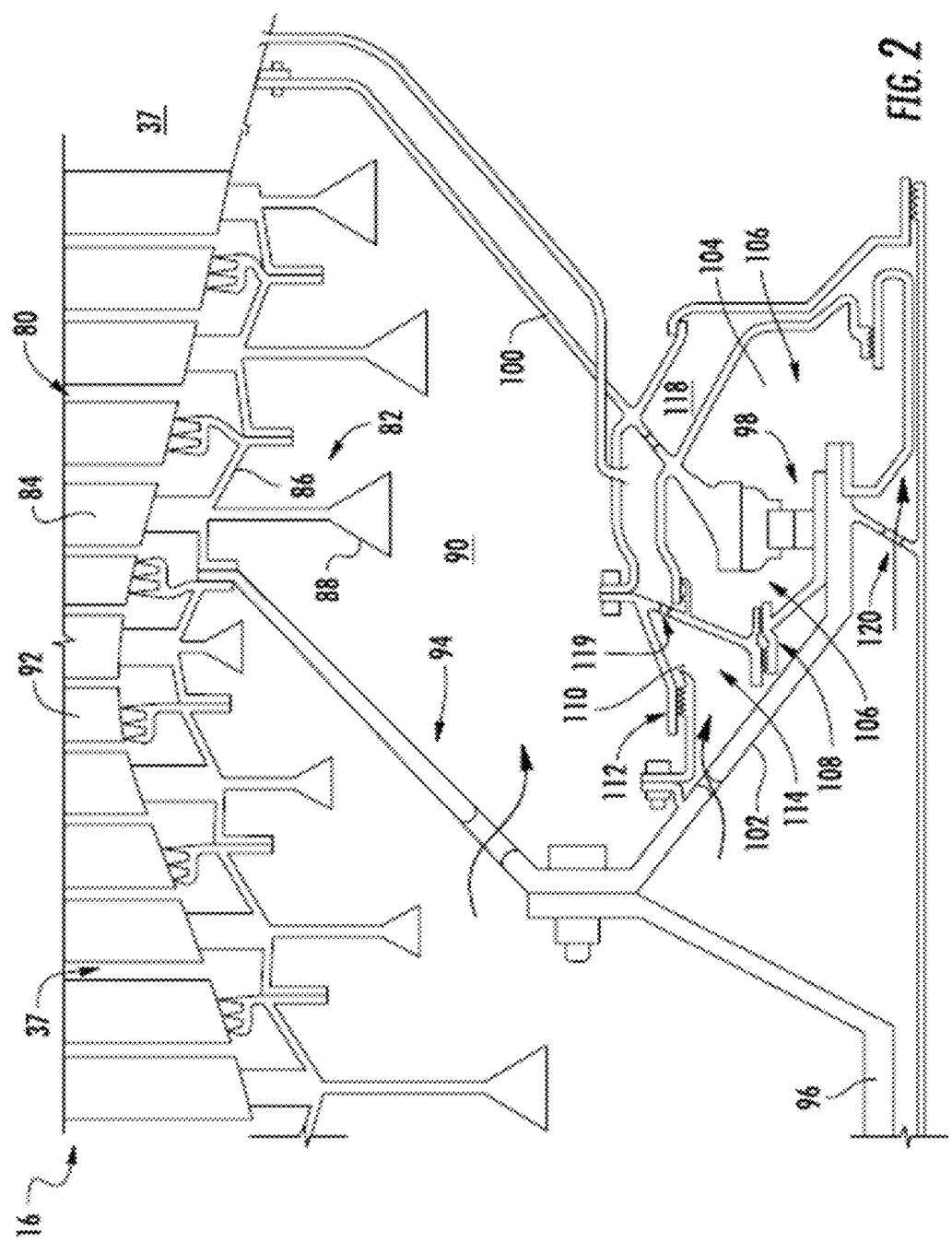
FIG. 2 is a cross-sectional view of a portion of a gas turbine engine in accordance with another exemplary embodiment of the present disclosure.

Referring now to FIG. 2, a schematic, cross-sectional view of an aft end of a gas turbine engine 10 in accordance with an exemplary embodiment of the present disclosure is provided. Specifically, FIG. 2 depicts an aft end of a core engine 16 of the exemplary gas turbine engine 10 in accordance with an exemplary embodiment of the present disclosure. In certain exemplary embodiments, the exemplary gas turbine engine 10 of FIG. 2 may be configured in substantially the same manner as exemplary gas turbine engine 10 of FIG. 1. Accordingly, the same or similar numbering may refer to the same or similar part.

As is depicted, the core engine 16 of the gas turbine engine 10 depicted includes a turbine section having a turbine 80. The turbine 80, in turn, includes a plurality of stages of rotatable rotors 82 attached to a corresponding plurality of stages of rotor blades 84—with each stage of rotors 82 including structural arms 86 attaching each respective stage of rotors 82 to the adjacent stages of rotors 82. Moreover, as depicted, each of the rotors 82 includes a base 88 positioned radially inward in a rotor bore cavity 90 defined by the gas turbine engine 10. Further, between each stage of rotor blades 84, the turbine 80 includes a plurality of stator vanes 92. A structural frame member 94 is attached to the plurality of stages rotors 82 and connects such rotors 82 to a shaft 96, such that the shaft 96 is drivingly connected to the turbine 80. In at least certain exemplary embodiments, the turbine 80 of the turbine section may be configured as a low pressure turbine (see LP turbine 30 in FIG. 1) and the shaft 96 may be configured as a low pressure shaft (see LP shaft 36 in FIG. 1). Accordingly, with such an exemplary embodiment, the shaft 96 may extend forward to a low pressure compressor (see LP compressor 22 in FIG. 1), such that rotation of the shaft 96 by the turbine 80 in turn rotates the low pressure compressor.

Furthermore, the core engine 16 includes a bearing 98 for supporting rotation of the shaft 96, the structural frame member 94, and the turbine 80. Specifically, the core engine 16 includes a static frame member 100 fixed to a non-rotating component of the core engine 16. Additionally, the structural frame member 94 includes an extension 102. The bearing 98 is positioned between the static frame member 100 and the extension 102 of the structural frame member 94, such that the static frame member 100 supports the structural member and shaft 96, e.g., axially and radially, through the bearing 98. The bearing 98 depicted is configured as a single roller bearing. However, in other exemplary embodiments, the bearing may instead include a plurality of bearings, such as a pair of roller bearings, a ball bearing and roller bearing, a pair of tapered roller bearings, etc. Additionally, in certain exemplary embodiments, the bearing 98 may be formed of a metal material, such as a stainless steel, or alternatively may be formed of a nonferrous material, such as a ceramic material.

As is also depicted, the gas turbine engine 10 includes a bearing sump 104 arranged in the core engine 16 for containing a lubrication in the form of oil provided to the bearing 98, where the lubrication is suitable for lubricating a rolling element bearing of a gas turbine engine (e.g., for lubricating an engine shaft bearing associated with either of the LP shaft 36 or HP shaft 34. The bearing sump 104 encloses the bearing 98, defines a bearing sump cavity 106, and includes a bearing seal 108 for preventing lubrication from escaping the bearing sump cavity 106.

Referring still to the exemplary embodiment of FIG. 2, the gas turbine engine 10 additionally includes at most one drain compartment positioned between the sump cavity of the bearing sump 104 and the rotor bore cavity 90 of the core engine 16. Specifically, for the embodiment depicted, the at most one drain compartment is configured as a primary drain compartment 110 including a drain seal 112 and defining a primary drain cavity 114. As depicted, the bearing sump seal 108 separates the bearing sump cavity 106 of the bearing sump 104 from the primary drain cavity 114 of the primary drain compartment 110. Additionally, the drain seal 112 separates the primary drain cavity 114 of the primary drain compartment 110 from the rotor bore cavity 90. The primary drain cavity 114 is configured to capture any lubrication that leaks past the sump cavity seal 108 during operation of the gas turbine engine 10.

As is also depicted in FIG. 2, the exemplary embodiment further includes a single cooling channel 118, also referred to as a pressurization air cavity. Specifically, the cooling channel 118 is configured to receive a flow of cooling air at an inlet 120 from, e.g., the compressor section, and is also fluidly connected to the cavity 114 of the primary drain compartment 110 via an opening 119. Accordingly, for the embodiment depicted, the primary drain compartment 110 and cooling channel 118 are combined. The cooling channel 118 may act as a heat barrier between the bearing sump cavity 106 and the rotor bore cavity 90. Notably, however, as the bearing sump 104 and lubrication are capable of operating at a relatively high temperature, no additional barriers or drain compartments are provided outward of the bearing sump 104, other than the cooling channel 118 and primary drain compartment 110, as depicted.

Further, the gas turbine engine 10 includes a drain line 116 fluidly connecting the primary drain cavity 114 to a desired location. For the embodiment depicted, the drain line 116 fluidly connects the primary drain cavity 114 to a core air flowpath 37 of the core engine 16 through the opening 119 and cooling channel 118. As discussed above, the lubrication may be configured as a nonflammable lubrication, and, thus, there may be less concern that the lubrication will combust if provided to the core air flowpath 37 within the turbine section of the core engine 16. With such a configuration, the core engine 16 may not require a dedicated strut extending through the core air flowpath 37 through which the drain line 116 would otherwise extend.

It should be appreciated, however, that in other embodiments, the drain line 116 may instead fluidly connect the drain cavity 114 to a location radially outward of the core air flowpath 37 of the core engine 16, such as to a bypass passage 56 of the gas turbine engine 10, or to an ambient location or any other suitable location. With such a configuration, the core engine 16 may include a strut extending through the core air flowpath 37 through which the drain line 116 extends to such location. Additionally, although the drain line 116 is depicted fluidly connected to the primary drain compartment 114 via the opening 119 and cooling channel 118, in other exemplary embodiments, the drain line 116 may instead be directly fluidly connected to the primary drain compartment 114.

Figure 3:
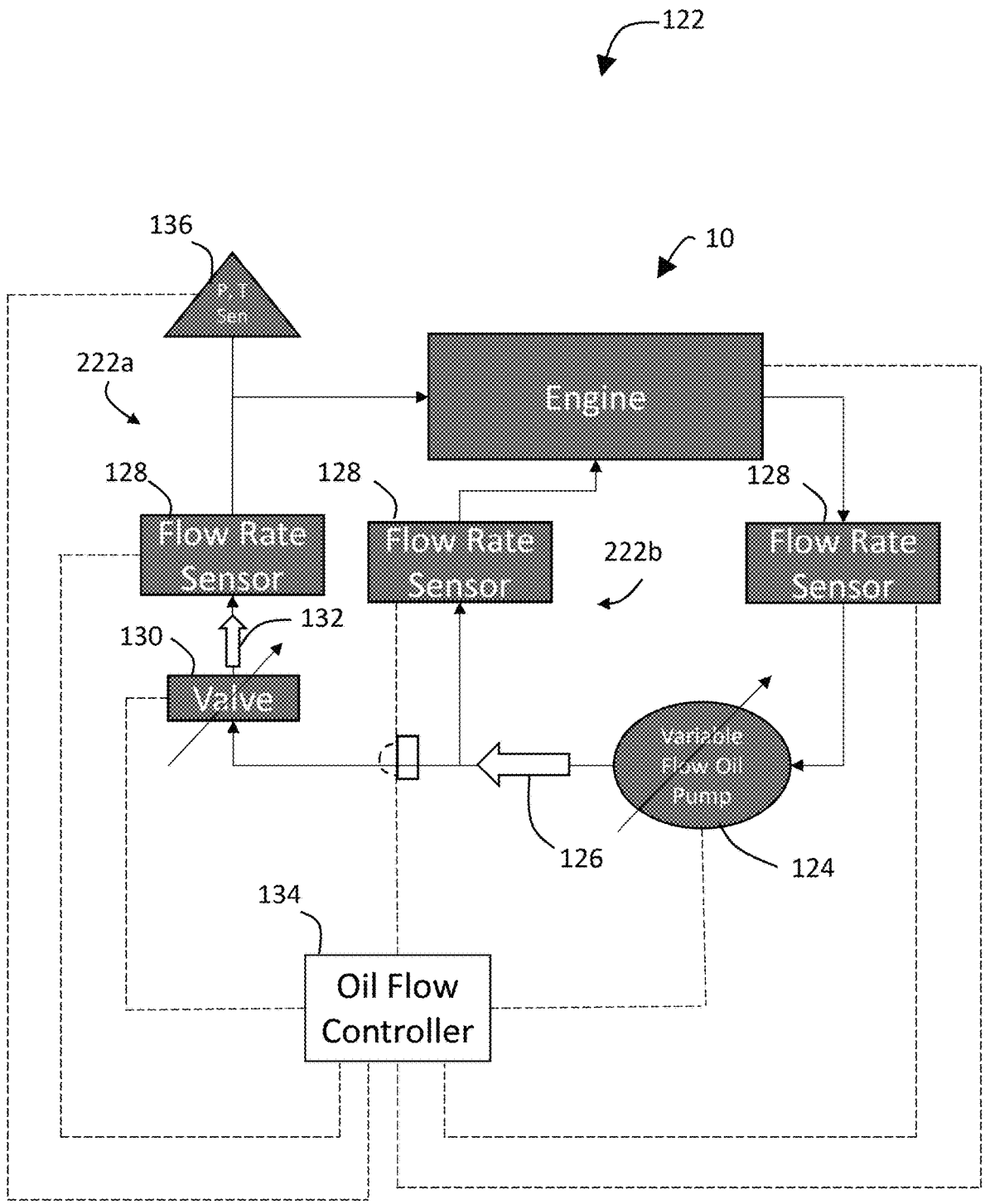
FIG. 3 is a schematic of an oil flow control system in accordance with an exemplary embodiment of the present disclosure.

Turning now to FIG. 3, an embodiment of an oil flow control system 122 is depicted which includes a gas turbine engine 10 which is configured to provide power during operation of the gas turbine engine 10 to a variable flow oil pump 124. The variable flow oil pump 124 can be configured to receive a shaft mechanical power directly from the gas turbine engine 10 (e.g., via an offtake shaft powered by either of the LP shaft 36 or HP shaft 34), but can be powered using other techniques as well. In one non-limiting form, the gas turbine engine 10 can provide mechanical power to an electric generator used to produce electricity. In this form, the variable flow oil pump 124 can be electrically driven and powered by the electric generator driven by mechanical power from the gas turbine engine 10.

The variable flow oil pump 124 is used to generate a pump variable flow of oil 126, the flow of which is delivered to an oil consumer. The oil consumer is associated with operation of the gas turbine engine 10, and can take the form of any component or system within the gas turbine engine 10 or any accessory that operates in conjunction with the gas turbine engine 10. For example, the oil consumer can be any of a power gearbox, engine shaft bearings, electric generator, accessories driven by the engine, etc. The oil consumer can use oil provided by the variable flow oil pump 124 either as a lubricant or as a heat exchange fluid, or both. The variable flow oil pump 124 can take on any variety of form useful to generate the pump variable flow of oil 126, including an electrically-driven form with speed control, or a variable displacement form. As illustrated, there is no bypass loop to return oil to an inlet of the variable flow oil pump 124 prior to the oil being used by an oil consumer. The variable flow oil pump 124 is capable of providing a variety of flow rates of oil to the oil consumer. The variable flow oil pump 124 can also provide fast response in flow rate output to changes in a pump control command. The variable flow oil pump 124 can provide a pump variable flow of oil 126 at a variety of flow rates. For example, the variable flow oil pump 124 can include pumping speeds that range from no flow rate, maximum flow rate, and partial flow rate. In one non-limiting example, the partial flow rate can include a single partial flow rate, while in another non-limiting example a plurality of partial flow rates are contemplated. The variable flow oil pump 124 can include partial flow rates that are discretized between the no flow and maximum flow rates, while in others the partial flow rates are continuously variable between the no flow rate and maximum flow rate.

The pump variable flow of oil 126 is depicted in FIG. 3 as being delivered to two different oil circuit branches where each oil circuit branch delivers oil to a different oil consumer. Although the embodiment depicted in FIG. 3 illustrates two oil circuit branches, other embodiments may have fewer or greater number of oil circuit branches. As depicted, the embodiment of FIG. 3 also includes flow rate sensors 128 useful to sense a rate of oil and generate a flow rate data indicative of the rate of oil. As each flow rate sensor 128 in each oil circuit branch can be associated with an oil consumer, and, given the incompressible nature of the oil flowing to the oil consumer, the flow rate data can be indicative of a rate of oil to the oil consumer.

An oil flow control valve 130 is positioned downstream of the variable flow oil pump 124 and is configured to provide a variable flow of oil to the oil consumer (e.g., power gearbox, engine shaft bearings, electric generator, accessories driven by the engine, etc.). The oil flow control valve 130 can be operated through use of a torque motor or a stepper motor and is structured to further regulate the flow of oil in the oil circuit branch in which the oil flow control valve 130 is located. The oil flow control valve 130 can provide a valve variable flow of oil 132 at a variety of flow rates to further regulate a flow of oil to the oil consumer beyond the regulation provided by the variable flow oil pump 124. For example, the oil flow control valve can provide the variable flow of oil 132 using valve positions that range from fully closed, fully opened, and partially opened. In one non-limiting example, the partially opened valve position can include a single partially opened valve position, while, in another non-limiting example, a plurality of partially opened valve positions are contemplated. The oil flow control valve 130 can include partially opened valve positions that are discretized between the fully closed and fully opened positioned, while, in other embodiments, the partially opened positions are continuously variable between the fully opened and fully closed valve positions. In one form, the valve variable flow of oil 132 is lower than that of the pump variable flow of oil 126, such as in the embodiment depicted in FIG. 3, in which the pump variable flow of oil 126 is split between oil circuit branches. It is contemplated, however, that in those embodiments which include only one oil circuit branch, the valve variable flow of oil 132 is the same as the pump variable flow of oil 124. Furthermore, in one mode of operation, the oil flow control valve may be fully closed, thus rendering the depiction in FIG. 1 as a single circuit branch embodiment until the oil flow control valve 130 is opened.

Although the oil flow control valve 130 is depicted as a conventional two-way valve having a single inlet fed from the variable flow oil pump 124 and a single outlet leading to an oil consumer, in some forms the oil control valve 130 can take on other valve types, including, but not limited to, a three-way valve, four way valve, etc. In these alternative forms, flow rate sensors 128 can be used in each of the split flow lines leading to respective oil consumers (or separate locations within a given oil consumer).

The oil flow control system 122 can also include flow rate sensors 128 that aid in determining a rate of oil which can include a mass flow rate or volumetric flow rate of oil. As depicted in FIG. 3, a flow rate sensor 128 is positioned downstream of the oil flow control valve 130, while another flow rate sensor 128 is positioned downstream of the variable flow oil pump 124 without an intervening oil flow control valve 130. Not all embodiments need include a flow rate sensor 128 in all conduits receiving oil from the variable flow oil pump 124. In some forms, fewer or greater numbers of flow rate sensors 128 can be used. Further to the above, a flow rate sensor 128 can be positioned on a return branch from the gas turbine engine 10 to the variable flow oil pump 124. The flow rate sensor 128 on the return branch can be used to determine a rate of oil returning toward the variable flow oil pump 124. Though the embodiment depicted in FIG. 3 illustrates flow rate sensors 128 on each oil circuit branch and return branch, few numbers of flow rate sensors 128 can be used. For example, if only knowledge of oil delivery to an oil consumer is needed, then the flow rate sensor 128 on the return branch to the variable flow oil pump 124 may not be needed. In other embodiments, the inclusion of multiple flow rate sensors 128 can be used for fault detection purposes and/or failure accommodation purposes.

The flow rate sensors 128 are capable of determining a mass flow rate or volumetric flow rate of oil, and can generate flow rate data indicative of a rate of oil capable of being sensed by the flow rate sensors 128. The flow rate sensors 128 can take a variety of forms, including, but not limited to, a turbine flow meter and an ultrasonic flow meter, to set forth just a few examples.

An oil flow controller 134 is used in the gas turbine engine oil flow control system 122 to monitor operation of the gas turbine engine 10 and any oil consumer associated with operation of the gas turbine engine 10, and adjust a flow of oil to the oil consumer through use of the variable flow oil pump 124 and flow rate sensors 128. The oil flow controller 134 can be integrated into an engine controller (e.g., a full authority digital engine controller (FADEC) or like device illustrated as controller 111 in FIG. 1), or can stand alone and interface with the engine controller. The oil flow controller 134 can be configured to receive and/or determine a variable consumption demand of the oil consumer. For example, the oil flow controller 134 may receive a variable consumption demand from the engine controller based on operation of the gas turbine engine 10. In some applications, small changes to a speed of the core turbine engine 16 can translate to large changes in power flow through the power gear box 46 which can result in large changes in demand for delivery of oil. In such an application, the variable consumption demand from the engine controller may prompt large changes to the variable flow oil pump 124 and/or the oil flow control valve 130. In one non-limiting example of oil flow to the power gear box 46, the oil flow can be used to lubricate and cool gears in the power gear box 46 as well as bearings in the power gear box 46. Oil flow to the gears can be 8.8 gallon per minute (33 liters per minute) at takeoff power, but only 6.4 gallons per minute (24.3 liters per minute) at ground idle. Oil flow to the bearings can be 1.9 gallons per minute (7.1 liters per minute) at takeoff power, but only 1.4 gallons per minute (5.2 liters per minute) at ground idle.

The oil flow controller 134 is configured to receive the flow rate data from the flow rate sensors 128 and generate a pump control command to control the variable flow oil pump 124. In some forms, the oil flow controller 134 can also receive information (e.g., data, commands, etc.) from the engine controller in those embodiments in which the oil flow controller 134 is not integrated into the engine controller. The oil flow controller 134 can be in wired or wireless communication with each of the flow rate sensors 128 and variable flow oil pump 124. In some forms, a data bus can be used to transmit the pump control command and/or the flow rate data.

The oil flow controller 134 can also receive flow data generated from a flow data sensor 136 representative of a state of oil, such as temperature or pressure. Although only a single flow data sensor 136 is provided, greater numbers of flow data sensors 136 can be used in the oil flow control system 122, and can be placed in any location throughout the gas turbine engine oil flow control system 122. The flow data generated from the flow data sensor 136 can be used to confirm appropriate delivery of fluid to any given oil consumer associated with the flow data sensor 136 and/or change a rate of oil being delivered to the oil consumer on the basis of the flow data.

The oil flow controller 134 can, thus, generate the pump control command to provide a pump variable flow of oil that, in the aggregate, will satisfy each of the oil consumers associated with operation of the gas turbine engine. Additionally, the oil flow controller 134 can generate a valve command for the oil flow control valve 130 to provide a valve variable flow of oil 132 suitable for an oil consumer(s) associated with the circuit branch (222a-222e) related to the oil flow control valve 130. It is contemplated that the pump variable flow of oil will equal the summation of all circuit branches associated with an oil consumer, whether each of the circuit branches include an oil flow control valve 130 or not. In those branches that do not include the oil flow control valve 130, it is contemplated that those particular branches may be sized to receive a wide variety of rate of oil given the regulation of the pump variable flow of oil 126 and the valve variable flow of oil 132. Further to the above, and with particular respect to the flow data sensor 136, if an oil consumer, such as an electrical generator, requires cooling but a temperature of the oil measured by the flow data sensor 136 is high for the variable flow of oil 132 delivered from the oil flow control valve 130, then the oil flow controller can increase the variable flow of oil 132 by either increasing the rate provided from the oil flow control valve 130 and/or increasing the pump variable flow of oil provided from the variable flow oil pump 124.

Figure 4:
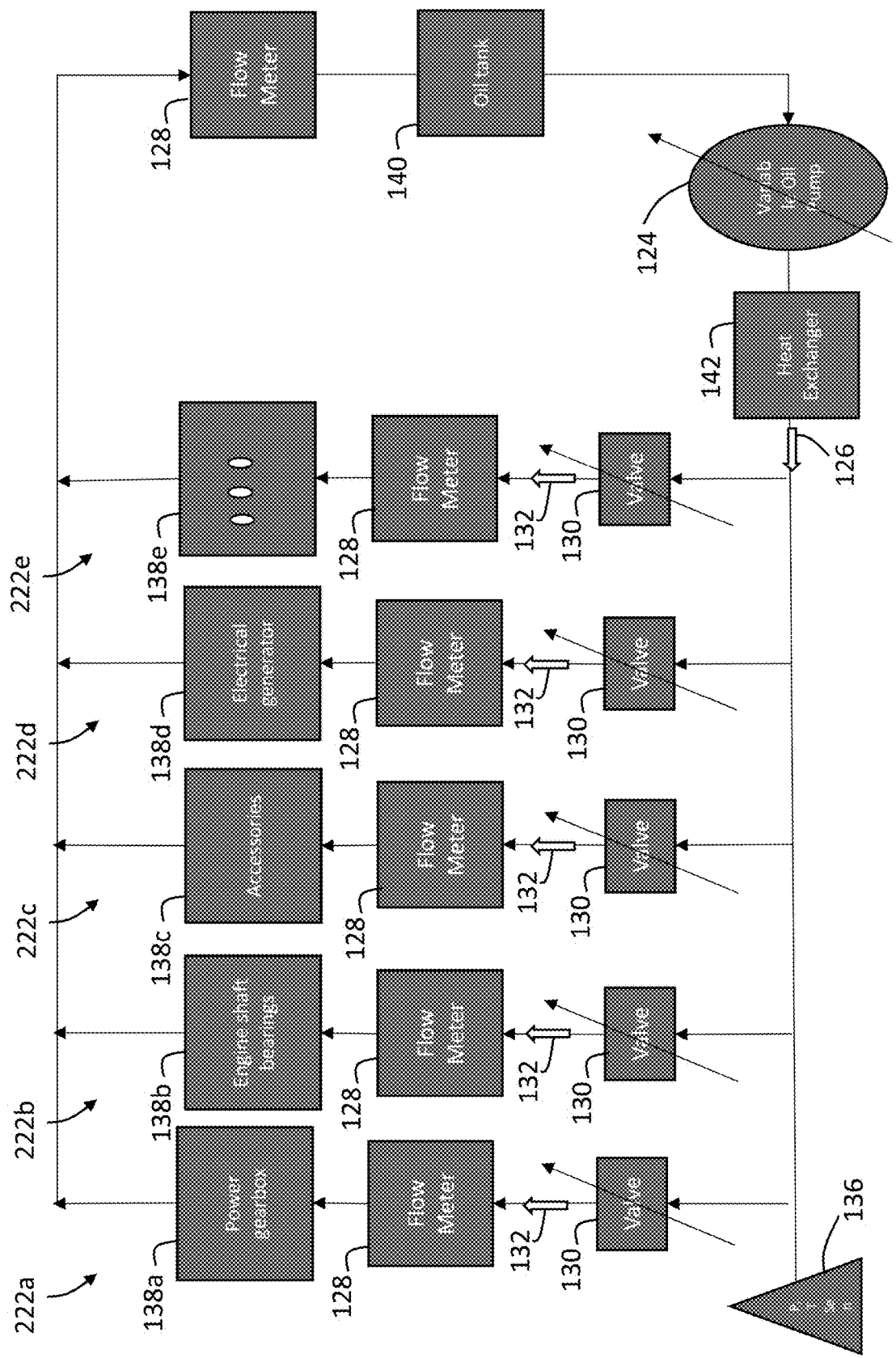
FIG. 4 is a schematic of an oil flow control system in accordance with another exemplary embodiment of the present disclosure.

Turning now to FIG. 4, another embodiment of the oil flow control system 122 is depicted, with at least one difference relative to FIG. 3 being the depiction of oil consumers 138a-138e (collectively referred to as oil consumer 138) associated with operation of the gas turbine engine 10. Like reference numerals refer to like elements as between FIGS. 3 and 4. The gas turbine engine 10 is not illustrated in FIG. 4, but it is implied, such as through engine shaft bearings 138b. Example oil consumers 138 depicted in FIG. 4 include a power gearbox 138a, engine shaft bearings 138b, accessories 138c, electrical generator 138d, and associated other oil consumers 138e (representing any number of other oil consumers). Also, although the oil flow controller 134 is not illustrated, it will be understood that the oil flow control valves 130, flow rate sensors 128, and flow data sensor 136 are in communication with the oil flow controller 134 as in the embodiments described elsewhere herein. For example, the oil flow controller 134 can generate a valve command to be sent to the oil flow control valve 130, and the flow rate sensors 128 generate flow rate data that is transmitted to the oil flow controller 134. The illustration in FIG. 4, therefore, is a simplified view of multiple circuit branches (222a-222e) where the presence of the oil flow controller 134 is assumed as present but not illustrated. Also, as stated above, although each of the circuit branches (222a-222e) leading to the oil consumers 138 are depicted as having both oil flow control valve 130 and flow rate sensors 128, it will be appreciated that some embodiments may lack one or both of the oil flow control valve 130 and flow rate sensors 128 in any given circuit branch leading to the respective oil consumer(s) 138.

The oil flow control system 122 can include an oil tank 140 positioned in a return branch to the variable flow oil pump 124, as well as a heat exchanger 142 in communication with an outflow of the variable flow oil pump 124 and before splitting to the various circuit branches. The oil tank 140 can be used to provide a reservoir from which the variable flow oil pump 124 draws a source of oil. The oil tank 140 can also act as a buffer given the incompressible nature of oil and the need to vary the rate of oil provided throughout the oil flow control system 122. Not all embodiments of the oil flow control system 122, however, include the oil tank 140. In similar fashion, not all embodiments of the oil flow control system 122 include the heat exchanger 142. In those embodiments that do include the heat exchanger 142, such as that depicted in FIG. 4, use the heat exchanger 142 to alter a temperature of the pump variable flow of oil 126. In some forms, the heat exchanger can be an on-demand heat exchanger capable of providing changing cooling and/or heating to the oil flowing through the heat exchanger 142. In other forms, however, the heat exchanger 142 is captive to the nature of its design. The heat exchanger 142 can be an air/oil heat exchanger, or fuel/oil heat exchanger to suit the needs of any given application.

Figure 5:
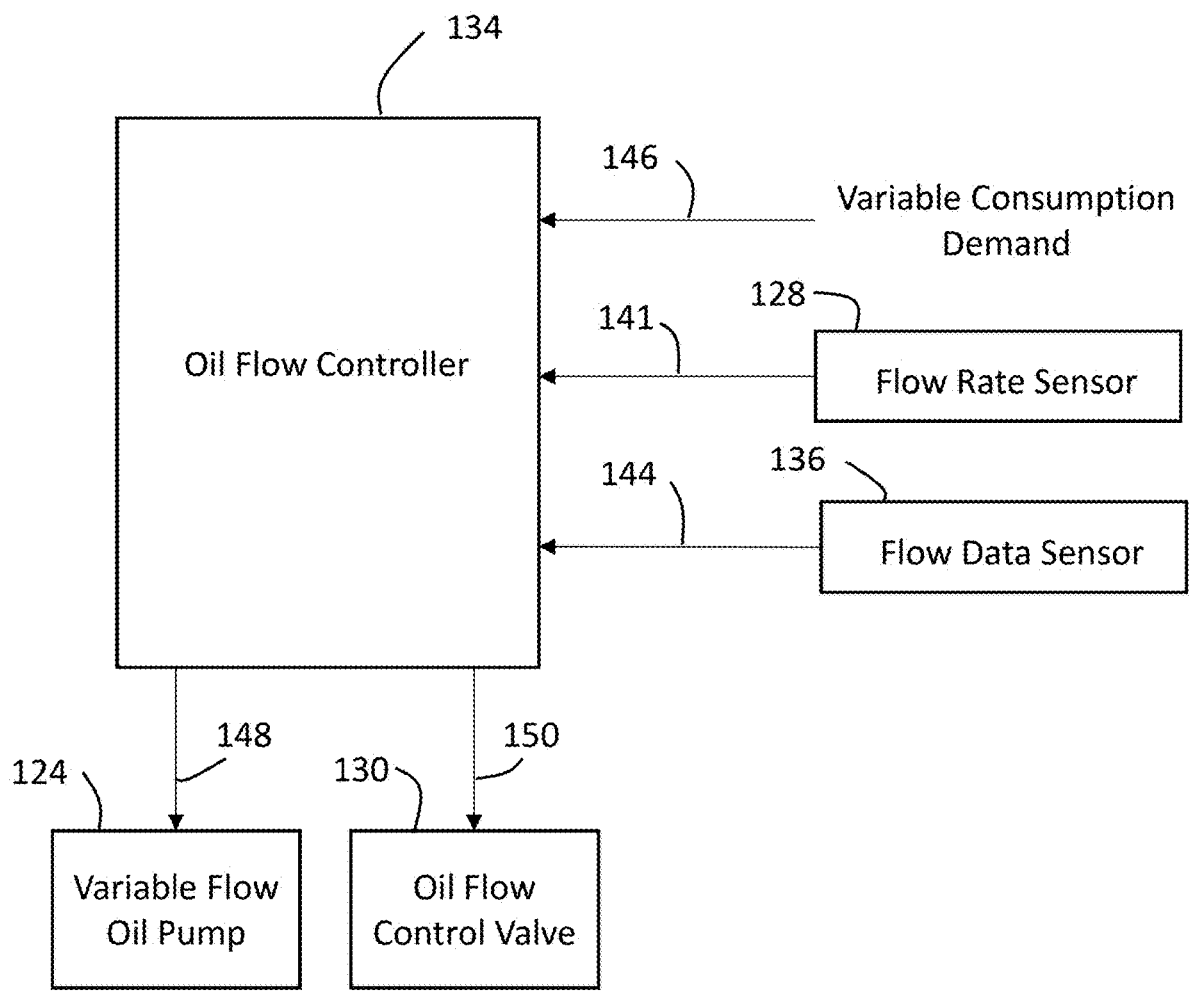
FIG. 5 is a schematic of an oil flow controller in accordance with another exemplary embodiment of the present disclosure.

Turning now to FIG. 5, an embodiment of the oil flow controller 134 is depicted as in communication with the flow rate sensor 128 and flow data sensor 136, each transmitting, respectively, flow rate data 141 and flow data 144. The oil flow controller 134 is also shown as receiving a variable consumption demand 146 which can originate from another controller, such as an engine controller. Alternatively, the oil flow controller 134 can receive operational data, in lieu of the variable consumption demand 146, and determine, within the oil flow controller 134, the variable consumption demand 146. For example, another device may send operational details related to operation of an oil consumer 138 which the oil flow controller 134 uses to determine the variable consumption demand. The determination of variable consumption demand 146 can be through any suitable algorithm, look-up table, or model, to set forth just a few non-limiting embodiments. The oil flow controller 134 can use the variable consumption demand, whether provided to the oil flow controller 134 or determined within the oil flow controller 134, in conjunction with the flow rate data 141, and in some embodiments the flow data 144, to determine a pump control command 148 and a valve command 150. The oil flow controller 134, as suggested above, can determine an aggregate variable consumption demand, such as through summation of the variable consumption demand of each oil consumer 138, to determine the pump control command 148. For example, if the oil flow controller 134 determines the power gearbox 138a and engine shaft bearings 138b require lubrication, but that accessories 138c and electrical generator 138d do not require lubrication, the oil flow controller 134 can add the variable consumption demand from each of 138a and 138b together to form an aggregate variable consumption demand. At another point in time, if the oil flow controller 134 determines that the electrical generator 138d requires lubricant for cooling at the same time as 138a and 138b, then the oil flow controller 134 can add the variable consumption demand from each of 138a, 138b, and 138d to form an aggregate variable consumption demand. In this way, in some embodiments, the aggregate variable consumption demand can be a time varying determination that represents a varying demand from varying numbers of consumers. The variable consumption demand for any given consumer 123a-138e can be a variable amount between a minimum flow (e.g., valve closed to produce a no flow condition) and a maximum flow (e.g., valve full open to produce a maximum flow condition). In some embodiments, the variable consumption demand may be an intermediate value between the minimum and maximum flow condition).

In addition and/or alternative to the above, the oil flow controller 134 can also determine the individual valve commands 150 for each of the separate oil flow control valves 130 to provide the appropriate flow of oil to meet lubrication and/or thermal requirements of the oil consumers 138. In some embodiments, the valve 130 associated with each of the consumers 138a-138e can be commanded to be either open or closed, for example, in those embodiments which include either full flow or no flow of lubricant. In still further embodiments, the valve 130 associated with each consumer 138a-138e can provide an intermediate valve position between a fully open and a fully closed position. Any number of intermediate valve positions can be provided. In some forms the valve command issued by the oil flow controller 134 can be continuously variable, while in others it is a command having quantized values (e.g., a digital command within the oil flow controller 134 that is converted to analog output for driving the valve 130). To set forth just one example, a valve command to the valve 130 associated with the power gearbox 138a can issued by the oil flow controller 134 to provide partial flow of lubricant to the power gearbox 138a while at the same time that a discrete valve open command is provided by the oil flow controller 134 to valve 130 associated with the accessory 138c to provide either fully open or fully closed position. In some forms, each valve 130 associated with respective consumer 138a-138e can be different from one another, with, for example, valve 130 associated with the accessory 138c providing either fully open or fully closed position, while valve 130 associated with power gearbox 138a providing at least one intermediate position between fully open and fully closed position.

In one mode of operation, the oil flow controller 134 can provide a minimum pressure to each of the oil consumers 138, and if sufficient capacity remains in the variable flow oil pump, additional flow of oil can be commanded via the pump control command 148 to generate additional flow for thermal cooling purposes. For example, if the variable flow oil pump 124 has a maximum flow capacity at a given flow rate, and if one or more consumers 138 demand a minimum pressure for lubrication purposes while one or more other consumers 138 demand lubricant for cooling purposes, the oil flow controller 134 can prioritize the allocation of lubricant via commands to valves 130 associated with each consumer 138 for lubrication purposes, and thereafter allocate remaining flow capacity (e.g., subtract the capacity associated with the consumers 138 requesting for lubrication purposes from maximum flow capacity) for cooling purposes to the other consumers 138 requesting for cooling purposes. If insufficient capacity remains to provide thermal cooling purposes, the oil flow controller 134 can either deny the request for thermal cooling purposes, or, if in the example of a variable flow vale 130, issue a partial valve command to partially provide flow of lubricant for thermal cooling purposes.

Additionally and/or alternatively to the above, the oil flow controller 134 can provide either open loop commands (e.g., no feedback or other estimation to provide dynamic regulation of lubricant flow rate) to one or both of the variable flow oil pump 124 and oil flow control valve 130, or can provide closed loop commands (e.g., feedback or estimation used to provide dynamic regulation of lubricant flow rate). For example, the oil flow controller 134 can determine a flow rate of oil delivered from the oil flow control valve 130 and compare it to a desired flow rate of oil determined based on the variable consumption demand 146. In some embodiments, a flow rate sensor and/or pressure sensor can be used either directly to provide feedback of the amount of lubricant delivered, or can be used to calculate a flow rate of the amount of lubricant delivered. The oil flow controller 134 can close the loop using any of a number of potential variables, including flow rate, flow pressure, or lubricant demand. For example, if the oil flow controller 134 closes the loop based on lubricant demand, the oil flow controller 134 can include control functionality to convert measured lubricant pressure to an actual flow rate, and convert variable consumption demand from any given consumer 138 to a desired flow rate of. If the flow rate from the oil flow control valve 130 is in error (e.g., a difference between desired flow rate and actual flow rate provided from the oil flow control valve 130), the oil flow controller 134 can command the oil flow control valve 130 to open or close depending upon the error.

Figure 6:
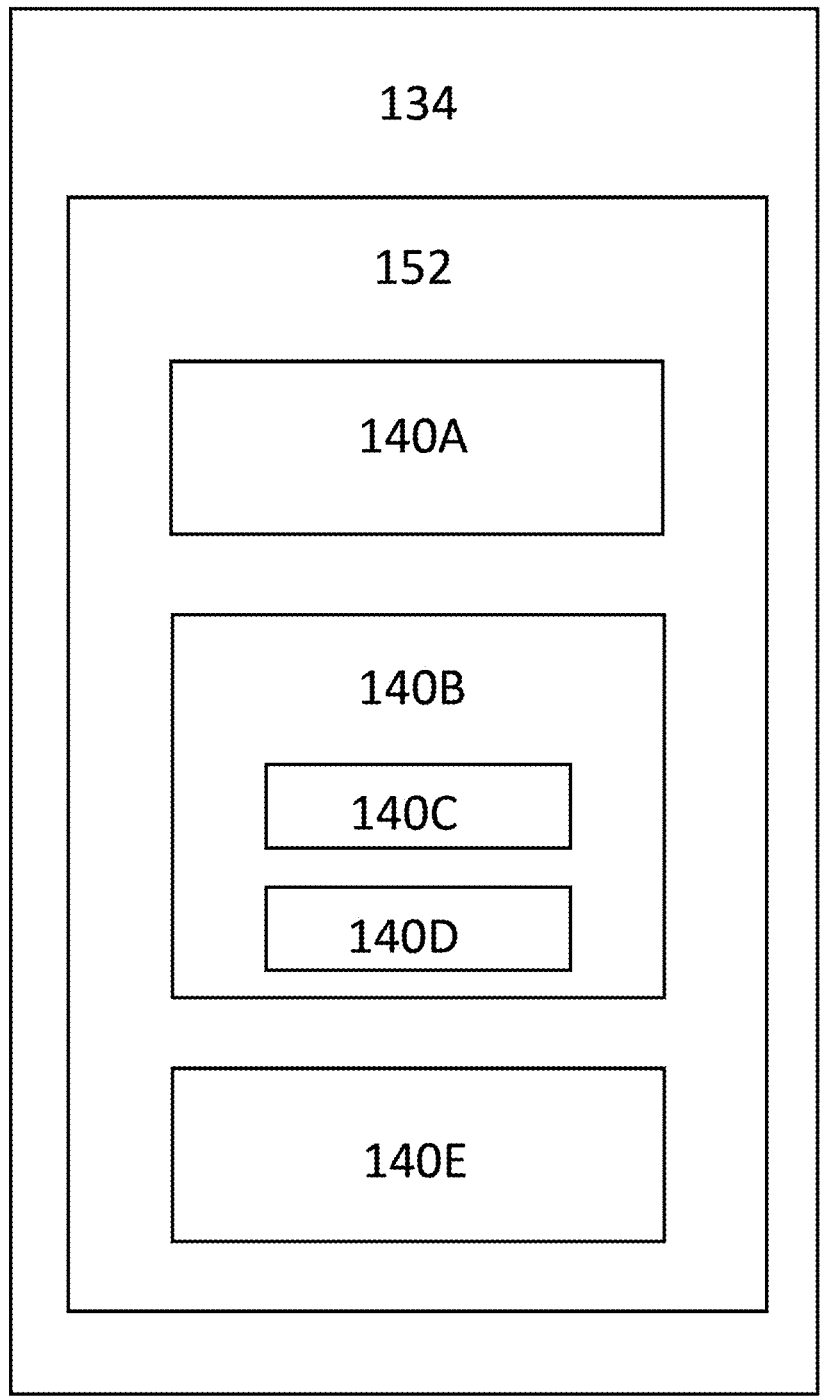
FIG. 6 is a schematic of a computing device in accordance with another exemplary embodiment of the present disclosure.

Turning now to FIG. 6, one or more portions of the oil flow controller 134 can be implemented using a computing device 152, one embodiment of which is illustrated in FIG. 5. The computing device(s) 152 can include one or more processor(s) 152A and one or more memory device(s) 152B. The one or more processor(s) 152A can include any suitable processing device, such as a microprocessor, microcontroller, integrated circuit, logic device, and/or other suitable processing device. The one or more memory device(s) 152B can include one or more computer-readable media, including, but not limited to, non-transitory computer-readable media, RAM, ROM, hard drives, flash drives, and/or other memory devices.

The one or more memory device(s) 152B can store information accessible by the one or more processor(s) 152A, including computer-readable instructions 152C that can be executed by the one or more processor(s) 152A. The instructions 152C can be any set of instructions that when executed by the one or more processor(s) 152A, cause the one or more processor(s) 152A to perform operations. In some embodiments, the instructions 152C can be executed by the one or more processor(s) 152A to cause the one or more processor(s) 152A to perform operations, such as any of the operations and functions for which the controller and/or the computing device(s) 152 are configured, the operations for any of the aforementioned systems such as the valve 223, etc., as described herein, and/or any other operations or functions of the one or more computing device(s) 152 (e.g., as a full authority digital engine controller). The instructions 152C can be software written in any suitable programming language or can be implemented in hardware. Additionally, and/or alternatively, the instructions 152C can be executed in logically and/or virtually separate threads on the one or more processor(s) 152A. The one or more memory device(s) 152B can further store data 152D that can be accessed by the one or more processor(s) 152A. For example, the data 152D can include data indicative of outside air conditions, power flows, data indicative of engine/aircraft operating conditions, and/or any other data and/or information described herein.

The computing device(s) 152 can also include a network interface 152E used to communicate, for example, with the other components of the systems described herein (e.g., via a communication network). The network interface 152E can include any suitable components for interfacing with one or more network(s), including for example, transmitters, receivers, ports, controllers, antennas, and/or other suitable components. One or more devices can be configured to receive one or more commands from the computing device (s) 152 or provide one or more commands to the computing device(s) 152.

The network interface 152E can include any suitable components for interfacing with one or more network(s), including for example, transmitters, receivers, ports, controllers, antennas, and/or other suitable components.

The technology discussed herein makes reference to computer-based systems and actions taken by and information sent to and from computer-based systems. One of ordinary skill in the art will recognize that the inherent flexibility of computer-based systems allows for a great variety of possible configurations, combinations, and divisions of tasks and functionality between and among components. For instance, processes discussed herein can be implemented using a single computing device or multiple computing devices working in combination. Databases, memory, instructions, and applications can be implemented on a single system or distributed across multiple systems. Distributed components can operate sequentially or in parallel.

Figure 7:
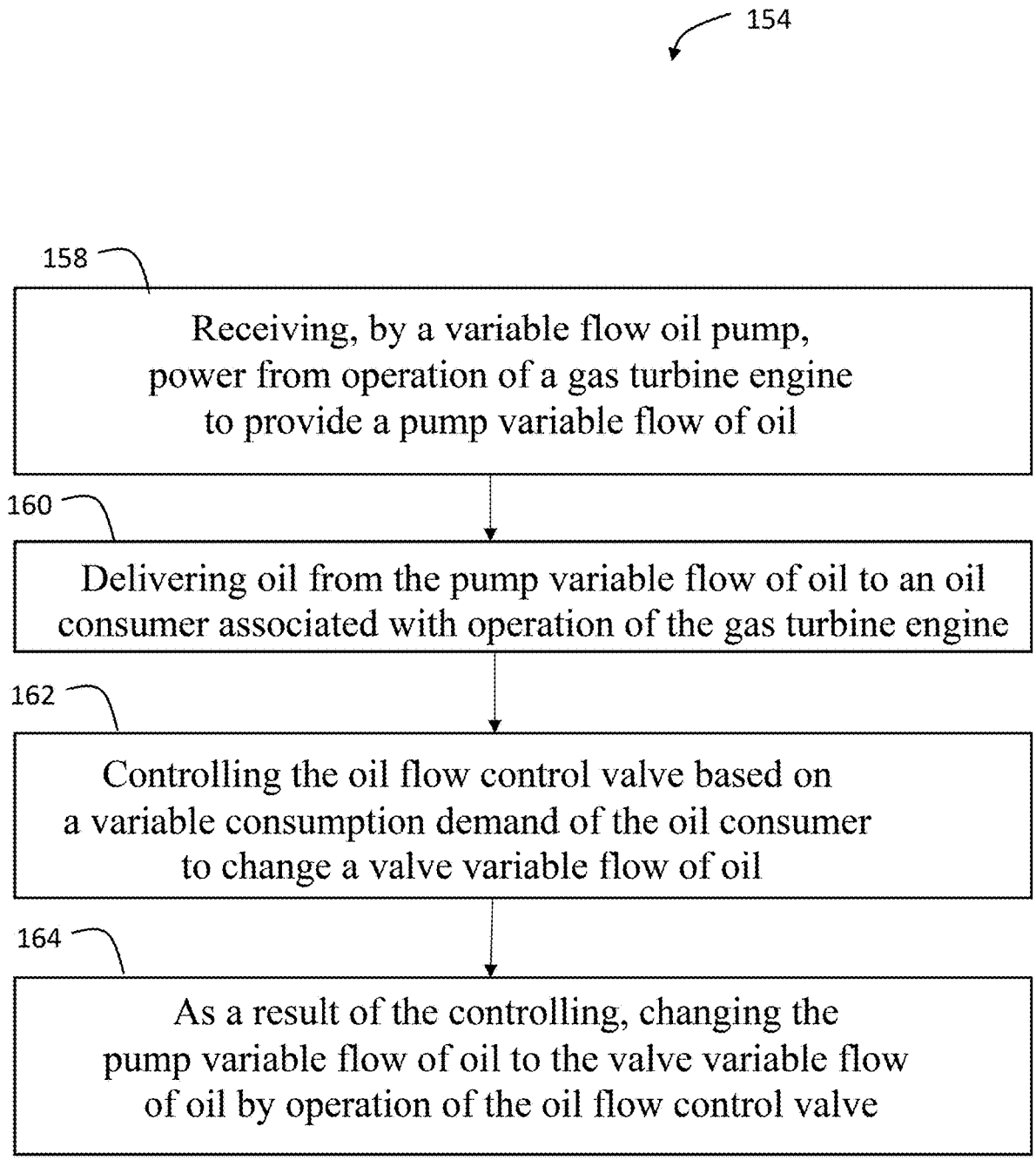
FIG. 7 is a depiction of a method of operating a gas turbine engine oil flow control system in accordance with another exemplary embodiment of the present disclosure.

FIG. 7 discloses a method 154 for operating a gas turbine engine oil flow control system 122. One or more steps of method 154 can be implemented using the oil flow controller 134 as discussed elsewhere herein. Any of the steps of method 154 implemented using a variety of control feedback techniques, including classical control, modern control, and robust control. Further, any of the steps can be implemented using data driven models developed from machine learning or any other artificial intelligence techniques. Data useful for the oil flow controller 134 can include sensed data as well as calculated data.

Method 154 includes, at step 158, receiving, by a variable flow oil pump, power from operation of a gas turbine engine to provide a pump variable flow of oil 126. The variable flow oil pump 124 can receive either mechanical power through, for example, a power take off from the gas turbine engine 10, or can be electrically driven and configured to receive power from, for example, electrical generator 138d. At step 160, the method 154 includes delivering the pump variable flow of oil 126 to an oil consumer 138 associated with operation of the gas turbine engine 10. In some embodiments, as the variable flow oil pump 124 is operated, a moving mechanical member internal to the variable flow oil pump 124 is actuated to provide pressurization and/or motive force to pump lubricant to one or more consumers 138. Step 162 includes controlling an oil flow control valve 130 based on a variable consumption demand 146 of the oil consumer 138 to change a valve variable flow of oil 132. As mentioned above, the oil flow control valve 130 can be controlled to provide for an open or closed position only in some embodiments, or a variable position between an open and a closed position. The method 154 can also include comparing a desired consumption demand for a given consumer 138 against an actual consumption for the given consumer 138. Comparing desired to actual consumption can include converting a flow rate or flow property of lubricant to an actual consumption (e.g., through a table lookup or other conversion technique) to a desired consumption demand. Alternatively, desired consumption demand can be converted to a flow rate or flow property (e.g., through a table lookup or other conversion technique) which is then compared to an actual flow rate and/or flow property. As a result of the controlling at step 162, step 164 provides changing the pump variable flow of oil to the valve variable flow of oil 132 by operation of the oil flow control valve 130. In some embodiments, the method 154 may also include generating a flow rate data 141 indicative of a rate of oil to the oil consumer 138. The method 154 may additionally include controlling the variable flow oil pump 124 based on the flow rate data 141. The method 154 may additionally and/or alternatively include controlling the variable flow oil pump 124 based on a summation of the variable consumption demand 146 of each of the plurality of oil consumers 138.

A technical benefit of the oil flow control system 122 is to provide custom lubrication and/or cooling to any oil consumer 138 associated with operation of the gas turbine engine 10. If one of the oil consumers 138 requires a greater flow rate for either or both lubrication and cooling purposes, (e.g., the electrical generator 138d may only require cooling in some embodiments which varies with operation of the gas turbine engine 10, while the power gearbox 138a may require for both lubrication and cooling at varying times during operation of the gas turbine engine 10) the oil flow controller 134 can command the variable flow oil pump 124 to change its pump variable flow of oil 126, whereupon the oil flow control valve 130 can adjust the valve variable flow of oil 132 for either the oil consumer 138 that requires the change, and/or adjust the valve variable flow of oil 132 for any other oil consumer 138 that may be impacted by the change in pump variable flow of oil 126 produced by the variable flow oil pump 124. For example, an oil consumer 138 that does not require a change in flow rate, but absent a change in the valve setting of its associated oil flow control valve 130 it experiences a change in flow rate in light of the change in the pump variable flow of oil 126, can have its valve position changed by the oil flow controller 134 to mitigate any changes to its valve variable flow of oil 132.

Further aspects are provided by the subject matter of the following clauses:

A gas turbine engine oil flow control system comprising: a gas turbine engine configured to provide power during operation of the gas turbine engine; a variable flow oil pump structured to generate a pump variable flow of oil; an oil flow control valve in fluid communication with the variable flow oil pump, the oil flow control valve structured to change a valve variable flow of oil through the oil flow control valve; an oil consumer associated with operation of the gas turbine engine and configured to receive the valve variable flow of oil changed by the oil flow control valve, the oil consumer having a variable consumption demand for delivery of oil; and an oil flow controller configured to generate a valve command for the oil flow control valve based on the variable consumption demand of the oil consumer.

A gas turbine engine oil flow control system comprising: a variable flow oil pump structured to generate a pump variable flow of oil during operation of a gas turbine engine; an oil flow control valve in fluid communication with the variable flow oil pump, the oil flow control valve structured to change the pump variable flow of oil to a valve variable flow of oil through operation of the oil flow control valve; an oil consumer associated with operation of the gas turbine engine and configured to receive the valve variable flow of oil changed by the oil flow control valve, the oil consumer having a variable consumption demand for delivery of oil; and an oil flow controller configured to generate a valve command for the oil flow control valve based on the variable consumption demand of the oil consumer.

The gas turbine engine oil flow control system of the preceding clause, wherein the valve variable flow of oil is used in the oil consumer is used as a lubricant, and wherein the valve variable flow of oil is used in the oil consumer as a thermal transfer fluid.

The gas turbine engine oil flow control system of any preceding clause, which further includes a flow rate sensor in fluid communication with the oil consumer, the flow rate sensor configured to generate flow rate data indicative of the valve variable flow of oil to the oil consumer.

The gas turbine engine oil flow control system of any preceding clause, wherein the oil flow controller is configured to generate a pump control command for the variable flow oil pump to produce the pump variable flow of oil based on the flow rate data from the flow rate sensor.

The gas turbine engine oil flow control system of any preceding clause, wherein the oil consumer includes a plurality of oil consumers.

The gas turbine engine oil flow control system of any preceding clause, wherein the plurality of oil consumers are configured in a parallel oil flow arrangement with each other.

The gas turbine engine oil flow control system of any preceding clause, wherein each of the plurality of oil consumers having a variable consumption demand for delivery of oil, and wherein an aggregate demand is a summation of the variable consumption demand related to each of the plurality of oil consumers.

The gas turbine engine oil flow control system of any preceding clause, where in the plurality of oil consumers include at least two of: a power gearbox; an engine shaft bearing; an accessory; and an electrical generator.

A gas turbine engine oil flow control system comprising: a gas turbine engine configured to provide power during operation of the gas turbine engine; a variable flow oil pump structured to receive power from the gas turbine engine and generate a pump variable flow of oil; an oil consumer associated with operation of the gas turbine engine and in fluid communication with the variable flow oil pump, the oil consumer having a variable consumption demand for delivery of oil; a first flow rate sensor configured to generate a first flow rate data indicative of a rate of oil to the oil consumer; and an oil flow controller configured to generate a pump control command to control the variable flow oil pump based on the first flow rate data to change the pump variable flow of oil.

A gas turbine engine oil flow control system comprising: a variable flow oil pump structured to receive power from the gas turbine engine and generate a pump variable flow of oil during operation of a gas turbine engine; an oil consumer associated with operation of the gas turbine engine and in fluid communication with the variable flow oil pump, the oil consumer having a variable consumption demand for delivery of oil; a first flow rate sensor configured to generate a first flow rate data indicative of a rate of oil to the oil consumer; and an oil flow controller configured to generate a pump control command to control the variable flow oil pump based on the first flow rate data to change the pump variable flow of oil.

The gas turbine engine oil flow control system of the preceding clause, which further includes an oil flow control valve in fluid communication with the variable flow oil pump, the oil flow control valve structured to change the pump variable flow of oil to a valve variable flow of oil through operation of the oil flow control valve, and wherein the rate of oil to the oil consumer is the valve variable flow of oil.

The gas turbine engine oil flow control system of any preceding clause, wherein the oil flow controller is also configured to generate a valve command for the oil flow control valve based on the variable consumption demand of the oil consumer.

The gas turbine engine oil flow control system of any preceding clause, which further includes a second flow rate sensor positioned downstream of the oil consumer configured to generate a second flow rate data indicative of a rate of oil to the oil consumer.

The gas turbine engine oil flow control system of any preceding clause, which further includes an oil tank in fluid communication with the variable flow oil pump and a heat exchanger in fluid communication with the variable flow oil pump.

The gas turbine engine oil flow control system of any preceding clause, wherein the heat exchanger is in downstream fluid communication with the variable flow oil pump and upstream fluid communication with the oil consumer.

The gas turbine engine oil flow control system of any preceding clause, wherein an oil flow control valve is in downstream fluid communication with the heat exchanger, and wherein the oil consumer is in downstream communication with the oil flow control valve.

The gas turbine engine oil flow control system of any preceding clause, wherein the oil consumer includes a plurality of oil consumers, wherein each of the plurality of oil consumers includes a variable consumption demand, wherein during operation of the plurality of oil consumers the oil flow controller determines the pump control command based on an aggregate of the variable consumption demand of the plurality of oil consumers.

The gas turbine engine oil flow control system of any preceding clause, wherein the oil flow controller is configured to generate the pump control command based on the oil demand of the oil consumer.

The gas turbine engine oil flow control system of any preceding clause, which further includes an oil flow passage in fluid communication with the oil consumer, variable flow oil pump, and oil flow control valve;

A method of operating a gas turbine engine oil flow control system comprising: generating power during operation of a gas turbine engine; receiving power to provide a pump variable flow of oil; delivering oil from the pump variable flow of oil to an oil consumer associated with operation of the gas turbine engine; controlling an oil flow control valve based on a variable consumption demand of the oil consumer to change a valve variable flow of oil; and as a result of the controlling, changing the valve variable flow of oil by the oil flow control valve.

A method of operating a gas turbine engine oil flow control system comprising: receiving, by a variable flow oil pump, power from operation of a gas turbine engine to provide a pump variable flow of oil; delivering oil from the pump variable flow of oil to an oil consumer associated with operation of the gas turbine engine; controlling an oil flow control valve based on a variable consumption demand of the oil consumer to change a valve variable flow of oil; and as a result of the controlling, changing the pump variable flow of oil to the valve variable flow of oil by operation of the oil flow control valve.

The method of the preceding clause, which further includes generating a flow rate data indicative of a rate of oil to the oil consumer.

The method of any preceding clause, which further includes controlling the variable flow oil pump based on the flow rate data.

The method of any preceding clause, wherein the oil consumer includes a plurality of oil consumers each having a variable consumption demand, and which further includes controlling the variable flow oil pump based on a summation of the variable consumption demand of each of the plurality of oil consumers.

A gas turbine engine control comprising: a gas turbine engine configured to provide power during operation of the gas turbine engine; an oil flow control circuit having an oil flow passage structured to deliver a variable flow of oil; an oil consumer configured to receive the variable flow of the oil in the oil flow control circuit, the oil consumer having a variable consumption demand for delivery of oil; a variable flow oil pump structured to receive power from the gas turbine engine and generate the variable flow of oil in the oil flow control circuit; a first flow rate sensor in fluid communication with the oil flow circuit, the first flow rate sensor configured to generate a first flow rate data indicative of a rate of the variable flow of oil through the oil flow passage.

The gas turbine engine control of the preceding clause, which further includes an oil flow controller, wherein the oil flow controller is configured to generate a pump control command based on the first flow rate data to change a pump rate of the oil flow control circuit.

The gas turbine engine oil flow control system of the preceding clause, wherein the variable flow of oil is used in the oil consumer is used as a lubricant, and wherein the variable flow of oil is used in the oil consumer as a thermal transfer fluid.

The gas turbine engine oil flow control system of any preceding clause, which further includes a flow rate sensor in fluid communication with the oil consumer, the flow rate sensor configured to generate flow rate data indicative of the variable flow of oil to the oil consumer.

The gas turbine engine oil flow control system of any preceding clause, wherein the oil flow controller compares the variable consumption demand for the oil consumer to an actual consumption based upon at least one of a flow rate and a flow property.

The gas turbine engine oil flow control system of any preceding clause, wherein the oil flow controller compares at least one of a flow rate and a flow property to a desired flow rate and desired flow property, respectively, based upon variable consumption demand for the oil consumer.

The gas turbine engine oil flow control system of any preceding clause, wherein the oil flow controller is configured to generate a pump control command for the variable flow oil pump based on the flow rate data from the flow rate sensor.

The gas turbine engine oil flow control system of any preceding clause, wherein the oil consumer includes a plurality of oil consumers.

The gas turbine engine oil flow control system of any preceding clause, wherein the plurality of oil consumers are configured in a parallel oil flow arrangement with each other.

The gas turbine engine oil flow control system of any preceding clause, wherein each of the plurality of oil consumers having a variable consumption demand for delivery of oil, and wherein an aggregate demand is a summation of the variable consumption demand related to each of the plurality of oil consumers.

The gas turbine engine oil flow control system of any preceding clause, where in the plurality of oil consumers include at least two of: a power gearbox; an engine shaft bearing; an accessory; and an electrical generator.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A gas turbine engine oil flow control system comprising:

a variable flow oil pump structured to generate a pump variable flow of oil during operation of a gas turbine engine;

an oil flow control valve in fluid communication with the variable flow oil pump, the oil flow control valve structured to change the pump variable flow of oil to a valve variable flow of oil through operation of the oil flow control valve;

an oil consumer associated with operation of the gas turbine engine and configured to receive the valve variable flow of oil changed by the oil flow control valve, the oil consumer having a variable consumption demand for delivery of oil; and an oil flow controller configured to generate a valve command for the oil flow control valve based on the variable consumption demand of the oil consumer.

2. The gas turbine engine oil flow control system of claim 1, wherein the valve variable flow of oil is used in the oil consumer is used as a lubricant, and wherein the valve variable flow of oil is used in the oil consumer as a thermal transfer fluid.

3. The gas turbine engine oil flow control system of claim 1, which further includes a flow rate sensor in fluid communication with the oil consumer, the flow rate sensor configured to generate flow rate data indicative of the valve variable flow of oil to the oil consumer.

4. The gas turbine engine oil flow control system of claim 3, wherein the oil flow controller is configured to generate a pump control command for the variable flow oil pump to produce the pump variable flow of oil based on the flow rate data from the flow rate sensor.

5. The gas turbine engine oil flow control system of claim 1, wherein the oil consumer includes a plurality of oil consumers.

6. The gas turbine engine oil flow control system of claim 5, wherein the plurality of oil consumers are configured in a parallel oil flow arrangement with each other.

7. The gas turbine engine oil flow control system of claim 6, wherein each of the plurality of oil consumers having a variable consumption demand for delivery of oil, and wherein an aggregate demand is a summation of the variable consumption demand related to each of the plurality of oil consumers.

8. The gas turbine engine oil flow control system of claim 5, where in the plurality of oil consumers include at least two of: a power gearbox; an engine shaft bearing; an accessory; and an electrical generator.

* * * * *